Figure 1:
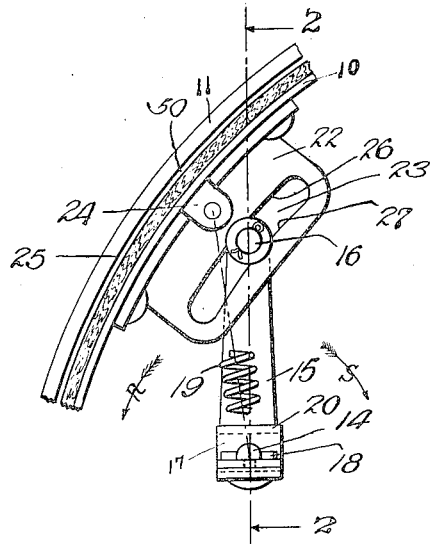

March 3, 1931.  G. L. SMITH  1,795,237

BRAKE MECHANISM

Filed March 7, 1929

GEORGE L. SMITH,
Inventor

By Henry T. Bright
Attorney

Patented Mar. 3, 1931

1,795,237

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE MECHANISM

Application filed March 7, 1929. Serial No. 345,206.

My invention relates to brake mechanisms and particularly to those which are self adjusting.

It is the purpose of my invention to provide a simple construction which will effectively maintain the clearance between two friction members, adapted to be forced into engagement for braking purposes, substantially a constant regardless of wear between them.

I will describe my invention in the best forms known to me at present and as applied to provide a clearance adjuster for an automobile brake, but it will be understood that the same is susceptible to changes in form and to desirable additions by the exercise of only ordinary mechanical skill and without departing from the spirit thereof.

Figure 2:
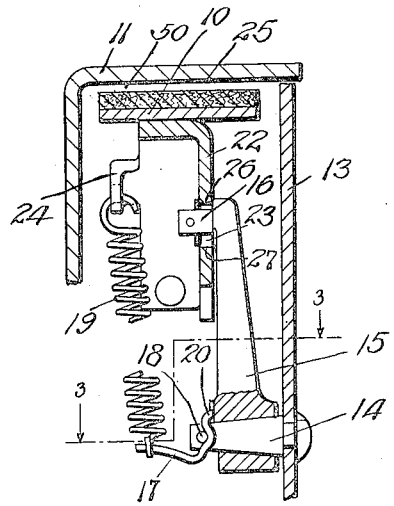
Figure 3:
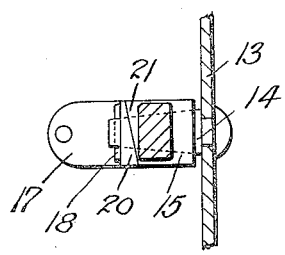
Figure 4:
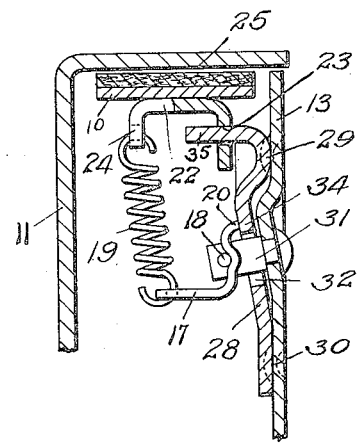
Figure 5:
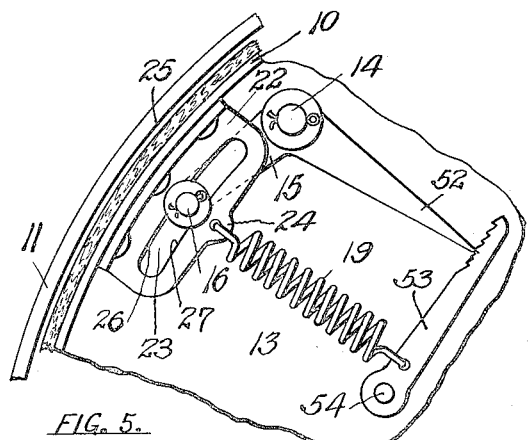

In the drawings chosen to illustrate my invention, the scope whereof is set forth in the appended claims:

Figure 1 is a side elevation of a portion of an internal expanding automobile brake having my improved brake clearance adjuster incorporated therein, certain parts being in section and other parts broken away;

Figure 2, a sectional view on the line 2—2 of Figure 1;

Figure 3, a sectional view on the line 3—3 of Figure 2;

Figure 4, a view similar to Figure 2 showing a modified form of my invention; and Figure 5, a view similar to Figure 1 showing still another modified construction of my invention.

Referring to the drawings and particularly to Figures 1, 2 and 3, 10 represents a brake band of an internal automobile brake, and 11 the brake drum thereof. A fixed backing plate 13 carries a conical pivot 14 upon which is mounted a lever 15 having a crank pin 16 at its free end. This lever is held in position on the pivot 14 by a clip 17 which fits over the small end of said pivot and is held in place by a keeper pin 18. A brake release spring 19 causes the toe 20 of clip 17 to press the lever 15 down on its conical pivot and thus produce considerable resistance to its turning.

Furthermore, I wish to cause the lever 15 to turn more easily in the direction of arrow R, Fig. 1, than it will in the opposite direction which I indicate by the arrow S, and to do this I form a slope on lever 15, as at 21, Fig. 3, and form the toe 20 with a corresponding slope which bears upon the slope 21. With this construction, movement of the lever 15 in one direction will be restricted by the action of the brake release spring 19 and in the other direction will be assisted by said spring.

The lever 15 is operatively connected to the brake band 10 by a guide clip 22 carried by the brake band 10 and having a slot 23 cut on a curve struck from the center of the brake. It also has an ear 24 turned up and to which one end of the spring 19 is connected. The crank pin 16 fits in the slot 23 as shown and when the spring 19 is secured in place it will pull the brake band inwardly and away from the drum surface 25 until wall 26 of slot 23 bears against crank pin 16. The width of slot 23 is greater than the diameter of pin 16 by an amount equal to the desired brake clearance 50 so that the brake band, when moved outwardly to make contact with the drum surface 25 of drum 11, will move freely until the clearance between pin 16 and slot 23 is taken up and the opposite wall 27 of slot 23 bears against the pin 16. If, when this takes place, further movement of the brake band is necessary to make contact with the drum, then the brake band will carry the lever 15 with it as it travels outward. Resistance to this rotation in the direction of arrow R is not great as in the direction of arrow S as previously described and only sufficient to keep the lever 15 from jarring out of position. When the brake band is released again the spring 19 pulls the band away from drum surface 25 until the wall 26 again rests against the pin 16 and, owing to the greater resistance to turning of the lever 15 in the direction of the arrow S, all further movement of parts is stopped and the band is held at a distance from surface 25 equal to the clearance between slot 23 and pin 16.

In Fig. 4 I show an alternative method of holding the brake band by the same principle of action. In place of the lever 15, I use a slidable clip 28 constrained to move in a radial direction by the buttons 29 and 30 pressed into the backing plate 13 and which act as guides, and also by a stud 31 which passes through an elongated slot 32 in clip 28. In this form of my invention the spring 19 acts in the same manner as spring 19 in Figure 1 and causes a pressure of toe 20 on the inclined portion 34 of the clip 28. The wedging action between clip 28 and the toe 20 will cause clip 28 to move easily towards the brake band, but will resist movement in the opposite direction. The clearance in this form of my invention is the clearance between toe 35 of clip 28 and slot 23 in clip 22.

In Fig. 5, the lever 15 has an arm 52 which engages a toothed ratchet pawl 53 pivoted at 54 to the backing plate 13. The brake release spring 19 also acts as the ratchet spring. In this construction the arm 52 will jump a tooth of the pawl and allow the pin 16 to follow out towards the drum whenever wear of the lining is sufficient to permit of this movement. Of course it will be understood that the pawl 53 in conjunction with the brake spring 19 and arm 52 serves to lock the lever 15 against movement in one direction, thus transforming the pin 16 into a positive stop to limit brake release movement of the brake band 10.

In the claims I use the following terms which relate to the various parts and their function.

Brake clearance adjuster,—being the mechanism described to adjust and maintain the running clearance between a brake and its related drum at any point on the circumference of the latter.

A brake member,—being the band or shoe for engaging the drum and producing a frictional resistance to rotation of the drum.

Lost-motion connection,—being a two-part connection, interfitting so loosely as to permit limited movement of one part with respect to the other part.

I claim:

1. In a brake clearance adjuster, the combination with a brake drum, a brake member having brake applying and releasing movements to and from the drum respectively and a brake release spring; of a stop for limiting release movement of the brake member, said stop having movement in two directions, means operated by brake applying movement of the brake member to impart step by step adjustment to the stop in one direction to maintain the clearance between adjacent faces of the drum and brake member substantially a constant regardless of wear of the brake member, and means controlled by the brake release spring to hold the stop against movement in the other direction after each step by step adjustment thereof.

2. In a brake clearance adjuster, the combination with a brake drum, and a brake member; of a slotted element carried by the brake member, a pivoted lever carrying a pin which is movable in the slot of said element, a pivoted ratchet coacting with the lever to lock the latter against movement in one direction, and a brake release spring connecting said slotted element and said ratchet.

3. In a brake clearance adjuster, the combination with a brake member, of a pivoted lever, a lost motion connection between the lever and brake member, and a lever positioning member locking the lever against movement in one direction, said positioning member being mounted independently of the lever.

4. In a brake clearance adjuster, the combination with a brake member, of a pivoted lever, a lost motion connection between the lever and brake member, and a ratchet device mounted independently of and coacting with the lever to lock the latter against movement in one direction.

5. In a brake clearance adjuster, the combination with a brake member, of a long and short arm pivoted lever, a lost motion connection between the short arm of the lever and the brake member, and means coacting with the long arm of the lever to lock said lever against movement in one direction.

6. In a brake clearance adjuster, the combination with a brake member, of a long and short arm pivoted lever, a lost motion connection between the short arm of the lever and the brake member, and a pivoted ratchet coacting with the long arm of the lever to lock said lever against movement in one direction.

7. In a brake clearance adjuster, the combination with a brake member, of a guide-way on the brake member having spaced guide surfaces concentric with the brake member, a long and short arm pivoted lever having a part on its short arm engaging said guide-way, and a pivoted ratchet coacting with the long arm of the lever to lock the lever against movement in one direction.

In testimony whereof I hereunto affix my signature.

GEORGE L. SMITH.